May 28, 1963
J. O. HRUBY, JR
3,091,483
FLEXIBLE PIPE CONNECTION HAVING LINE
PRESSURE ACTUATED SEALING MEANS
Filed March 28, 1960
2 Sheets-Sheet 1
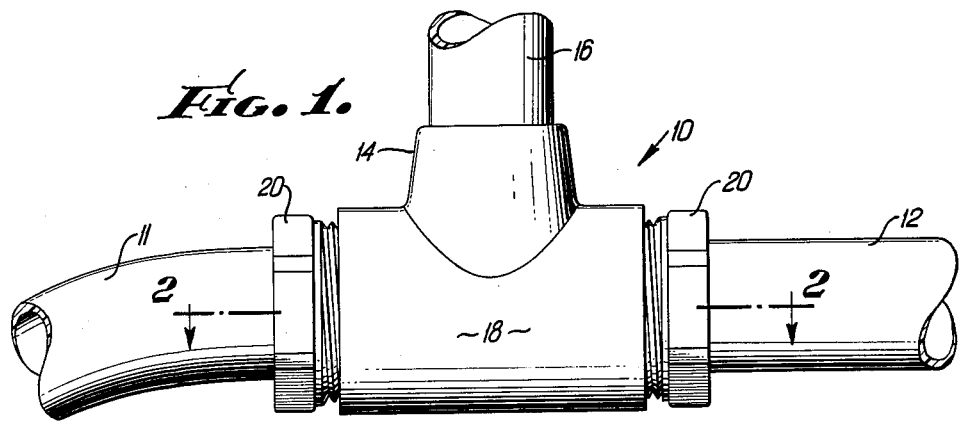
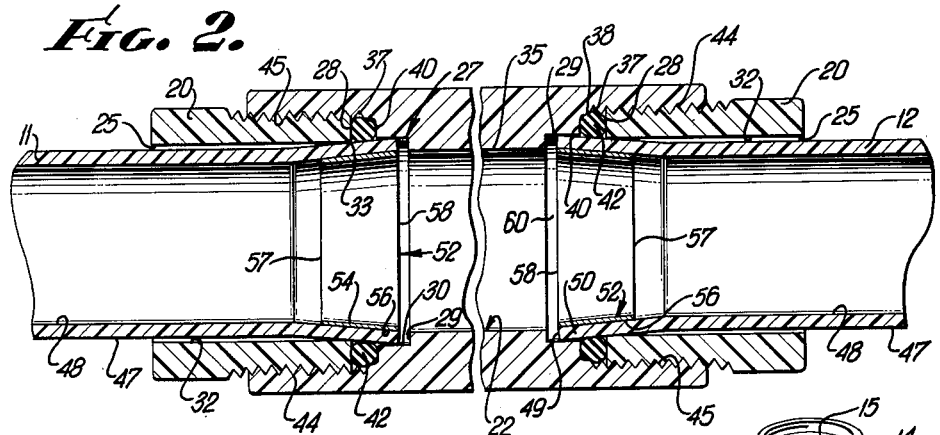
John O. Hruby, Jr.
INVENTOR.
BY
Beehler & Shanahan
ATTORNEYS.

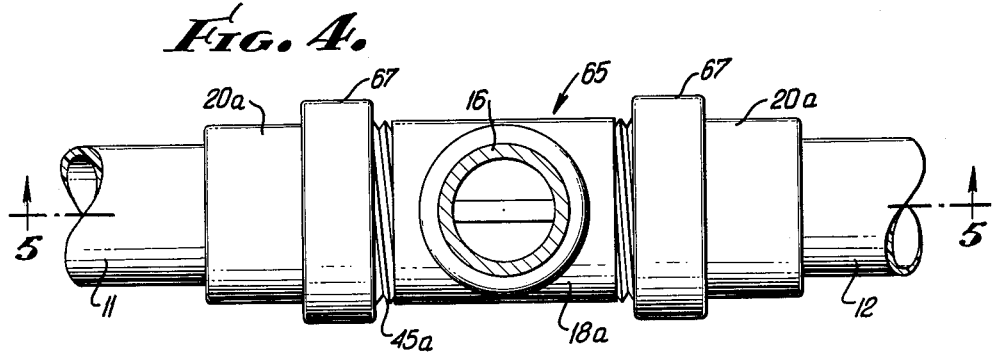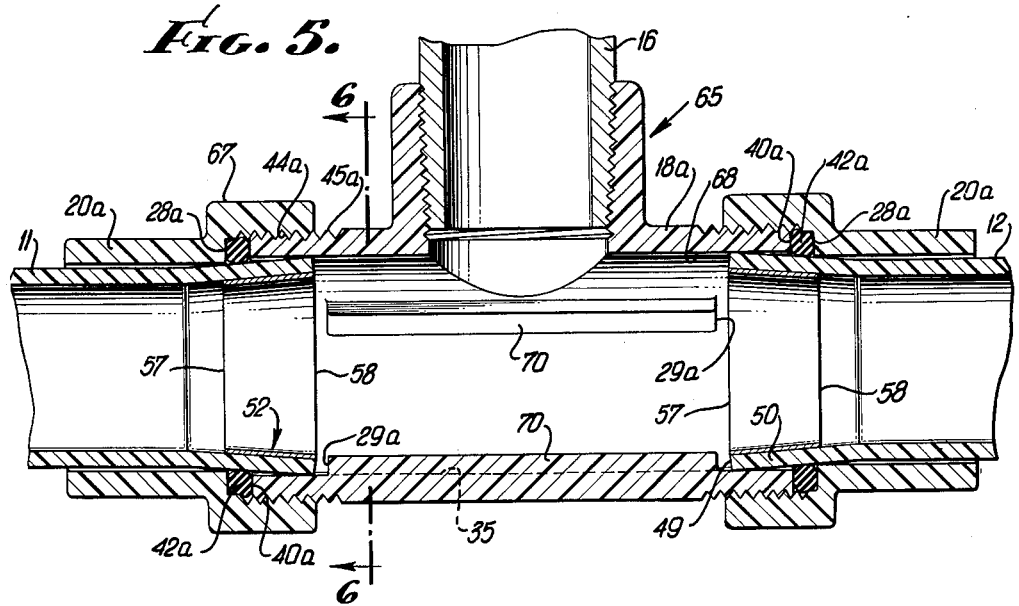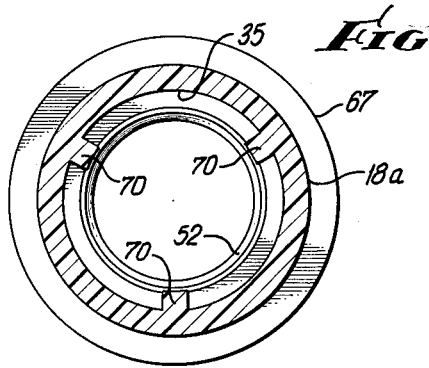

United States Patent Office 3,091,483
Patented May 28, 1963

3,091,483
FLEXIBLE PIPE CONNECTION HAVING LINE PRESSURE ACTUATED SEALING MEANS
John O. Hruby, Jr., Burbank, Calif., assignor to Rain Jet Corporation, Burbank, Calif., a corporation of California
Filed Mar. 28, 1960, Ser. No. 18,147
3 Claims. (Cl. 285—95)

This invention relates to improvements in pipe connections, and more particularly to structures for connecting a flexible pipe to a fitting in a fluid conveying system.

During the past few years there has been increased interest in the field of fluid conveying systems with the view of employing flexible plastic pipes where heretofore iron pipes have been used. An important advantage in using flexible plastic pipe is that it may be installed easily to extend around corners and over whatever practical length may be desired without necessitating the use of numerous elbows and other fittings. Such advantage makes flexible plastic pipes desirable for installations of lawn sprinkler systems, for example, in that almost any home owner may now install his own sprinkler system even though he be not skilled nor equipped with proper tools for installing a conventional system of iron pipes. It is easy and convenient to cut off a long run of flexible plastic pipe from a roll with a knife and then lay out the run of pipe to extend from a water outlet fitting to a riser for a sprinkler head. No special care need be taken in digging a trench for receiving the pipe because in the case of flexible plastic pipe, it need not extend straight underground. It is preferred to leave some slack and to snake the pipe into trenches to allow for expansion and contraction.

Besides being easy to install, flexible plastic pipe is long lasting and costs less than iron pipe. It is not damaged by freezing, and is not attacked by the corrosive elements often present in water and soil.

More enthusiastic acceptance of flexible plastic pipe as replacement for iron pipes in fluid conveying installations has been delayed because of the lack of suitable fittings for plastic pipe. Available fittings on the market, e.g. elbows, T's, unions, faucets, etc., which are being offered for sale and use with flexible plastic pipe employ a relatively long insert portion requiring extreme radial expansion of the pipe throughout a relatively long end portion of the pipe, and further require the use of band clamps or other fasteners to prevent the pipe from slipping off from the fitting. A most serious disadvantage of conventional insert type fittings is that they greatly reduce the size of the flow passage of the pipe system and substantially increase friction losses.

It is an object of this invention to provide a pipe connection structure by which a flexible plastic pipe is connected to a pipe fitting without reducing the cross-sectional size of the flow passage of the pipe system and by which friction losses are substantially minimized.

General objects of this invention are to provide a pipe connection structure of the above-mentioned character which is simple and efficient in construction, rugged and reliable (leakproof) in service, easy to install, disassemble and reassemble without the need for any special tools, and adapted to be manufactured at a low cost.

Further objects and advantages of this invention will appear in the course of the following part of this specification wherein the details of construction and mode of operation of two preferred embodiments of the invention are described with reference to the accompanying drawing, in which:

FIGURE 1 is a view in elevation of a pipe-T connected to and between the ends of two pipe sections according to this invention;

FIGURE 2 is a cross-section taken on line 2—2 of FIGURE 1;

FIGURE 3 is an exploded view of the component parts of a pipe connection structure of this invention and of the form illustrated in FIGURE 1;

FIGURE 4 is a top plan view of a pipe-T connected at opposite ends thereof to and between the ends of two pipe sections in another embodiment of this invention;

FIGURE 5 is a cross-section on an enlarged scale through the pipe connection structure of FIGURE 4 and taken along line 5—5 of FIGURE 4; and FIGURE 6 is a cross-section through the pipe connection structure taken along line 6—6 of FIGURE 5.

Referring to the drawings in greater detail the pipe connection structure of this invention is shown, for purposes of illustration, as the same may be adapted for connecting the ends of two flexible plastic pipe sections to a pipe-T in a lawn sprinkler system. The pipe-T of FIGURES 1-3 is designated generally by reference numeral 10 and the flexible pipe sections which are connected to the pipe-T are designated by numerals 11 and 12, respectively. The pipe-T has a stem portion 14 which is internally screw threaded 15 for connection to a conventional riser pipe 16 of iron, the upper end (not shown) of the riser pipe being adapted to mount a conventional sprinkler head (not shown). The stem portion 14 and the riser pipe 16 form no part of this invention.

A fitting in the form of a pipe-T has been chosen for purposes of illustration of an embodiment of this invention because a pipe-T serves as an example not only of a branch pipe connection (for riser 16), but also serves to illustrate how pipe connection structures of this invention may constitute a union or swivel fitting between the ends of two pipe sections.

The structural details of the connection between pipe section 12 and the pipe-T 10 are the same as those for the connection of pipe section 11 and the pipe-T, whereby a description of only one such connection is necessary. The pipe-T is formed of rigid material, e.g., metal or hard plastics, and comprises a tubular body portion 18 and an annular nut portion 20, the body portion including the stem portion 14 for the illustrated case. The inside surfaces of the fitting 10 are designated generally by reference numeral 22 and these define an open ended passage 24 extending through the fitting, the end opening of pertinence to the pipe section 11 connection being designated by numeral 25, i.e. left-hand end of annular nut 20 as the same appears in FIGURE 2.

There is an annular recess 27 formed in the inside of the body 18, concentric with the fitting passage, and defined by an annular shoulder surface 28, a stop surface 29 and an annular radially inward facing surface 30 which in the illustrated embodiment is cylindrical. The annular shoulder surface 28 constitutes the inner end of the annular nut 20 for the embodiment of FIGURES 1-3, and meets the inside surface 32 of the nut along a circular edge 33, inside surface 32 defining the outer end portion of the fitting passage 24. The stop surface 29 of the embodiment of FIGURES 1-3 is circumferentially continuous and extends radially outward from the middle portion 35 of the passage-defining inside walls 22.

An annular groove 37 is formed in the inside of the fitting, the groove being open to the recess 27 and being defined by the annular shoulder surface 28, groove-bottom surface 38, and an annular shoulder surface 40 which faces toward the shoulder surface 28. The groove 37 receives an elastomer gasket 42, preferably an O-ring, which becomes compressed between the shoulder surfaces 28 and 40 in the completed connection.

The nut and the body are adapted to be coupled as by screw threads 44 on the outside of the nut mateable with screw threads 45 on the inside of the body 18. The nut is rotatable around the pipe section 11 and is moveable axially of the pipe section whereby its screw threads may be engaged with the screw threads of the body for securing the nut on the body.

The cylindrical surface 30 of annular recess 27 is of larger diameter than the diameter of the inside circumference or edge 33 of the nut, whereby such recess will accommodate an expanded end portion of the pipe section. Flexible plastic pipes of medium density plastics are preferred, the more common of such flexible plastic pipes being of polyethylene.

The outside surface of flexible pipe 11 is designated by numeral 47, the inside surface by numeral 48 and the annular end surface by numeral 49. The end portion 50 of the pipe, i.e. the portion thereof which is circumferentially contiguous with annular end surface 49, is expanded into the annular recess 27 by means of an expanding insert 52.

Insert 52 has an inside surface 54 which defines an opening extending axially through the insert. The outside surface of the insert is designated by numeral 56, the same being frusto-conical and tapering radially outward from a top end edge 57 of the insert to a base end edge 58 of the insert. The diameter of the outer circumference of top end edge 57 is preferably about equal to the inside diameter of the pipe. The diameter of the outer circumference of the base end edge 58 is greater than the normal inside diameter of the pipe and is greater than the diameter of the inner extent of the stop surface 29.

Flexible pipe 11 is moveable axially in the fitting. The inner extent of such movement is a position where the end surface 49 of the pipe is forced against the stop surface 29 of the fitting body. In that position, the insert 52 will be entirely covered by the pipe, the insert being maintained within the pipe by engagement of its base end edge 58 against the stop surface 29.

From the above described position the pipe is moveable in a direction axially outward of the fitting to a position where outside surface 56 of the expanded end portion of the pipe is seated in circumferentially continuous engagement with the circular edge 33 of the nut. When the pipe is in its seated position the end surface 49 of the pipe and the base end edge 58 of the insert will be spaced from the stop surface 29 as is represented by the gap 60. Fluid pressure within the fitting passage assists in shifting the pipe toward its seated position, such outward movement of the pipe being absorbed in a curve of the pipe as is represented in FIGURE 1 by the curvature of pipe 11.

Although the pipe connection will be fluid-tight when the outside surface of the expanded pipe portion is seated against the edge 33 of the nut, the pipe connection structure of this invention does not rely entirely on the seating against edge 33 for making the connection fluid tight. Engagement of the expanded end portion of the pipe against the edge 33 prevents the pipe from being pulled or forced axially outward from the fitting. It is the O-ring 42 which ensures a fluid-tight connection whether or not the expanded portion of the pipe is seated against the nut edge 33. Such O-ring, being flexibly flowable, is compressed between the annular shoulder surfaces 28 and 40 such that it extends radially inward to press against the outside surface of the pipe along a circumferentially continuous region on the outside surface of the pipe between the planes of the top and base end edges of the insert.

To assemble the connection, the end of the pipe is passed first through the nut 20, then through the O-ring 42, the insert 52 is forced into the end portion of the pipe, the pipe is pushed axially inward until its end surface 49 engages the stop surface 29, and finally the nut 20 is rotated to engage its screw threads in the screw threads of the body and to compress the O-ring around the expanded end portion of the pipe.

Referring now to FIGURES 4–6 of the drawing, a pipe-T 65 is illustrated therein, the same embodying another form of a connection of this invention. The pipe-T 65 differs from that of the above-described embodiment in two particulars only, one being in the manner in which the annular nut is coupled to the body portion of the pipe-T, and the other being the structure which defines the stop surface against which the end of the pipe abuts when the pipe is moved to its inward-most extent in the fitting.

For the nut-body coupling structure of the pipe-T 65, the annular nut 20a of the pipe-T 65 has a skirt portion 67 extending axially beyond the annular shoulder surface 28a of the nut, the skirt portion being internally screw threaded at 44a for mating with the male threads 45a on the outside of the body 18a of pipe-T 65. The annular shoulder surface 40a which defines one sidewall of the annular grove for the O-ring 42a, constitutes an outer end surface of the body 18a and its inside circumference defines an end opening 68 for the body portion of the fitting passage.

With respect to the stop surface for the pipe-T 65, it is designated by reference numeral 29a, and it differs from the corresponding stop surface 29 of the pipe-T 10 in that stop surface 29a is not annular as is the case of the stop surface 29 of pipe-T 10. Stop surface 29a is segmental, it being defined by the ends of a circumferentially arranged series of spaced apart ribs 70 which extend radially inward from the middle inside surface portion 35 of the pipe-T 65. There are three such ribs 70 in the illustrated embodiment. The rib-type structure of FIGURES 4–6 provides a larger cross-sectional area for the middle portion of the fitting passage than does the circumferentially continuous structure of the embodiment shown in FIGURES 1–3. In the case where two pipes 11 and 12 are to be connected to a single fitting in axial alignment with each other, the ribs 70 may extend in a direction axially of the pipe fitting from the stop surface for one connection to the stop surface for the other connection.

The feature of this invention by which the elastomer pipe is made movable axially between two limits (shoulder 28 and stop surface 29) in the pipe fitting is of special importance. Were the pipe 11 secured or fixed in a seated position against the inside edge or seat 33 of shoulder 28, the cold flow characteristics of the pipe would cause the pipe, in time, to gradually extrude or creep out from within the shoulder edge 33. In the pipe connections of this invention, the pipe is movable axially inward from the seat 33 and it does so as a result of fluctuations in fluid pressure and especially when fluid flow is shut off. The flexibility of the pipe and outside pressure on the pipe causes the pipe to respond to changes in internal pressures by moving axially inward of the fitting under conditions of reducing pressures or flow shut-off, and to move in a direction axially outward of the fitting when internal pressure is increased to seating anew against the shoulder 28. Thus the pipe is not under constant pressure against its seat whereby it is not subject to deformation under load. Furthermore, the provision for accommodating axial movement of the pipe avoids development of any permanent set or annular depression in the outside surface of the pipe because of its seating against the edge of shoulder 28.

The pipe sections are rotatable in the fittings even after the flexibly flowable gaskets 42 are compressed sufficiently around the expanded portions of the pipes to make the connections fluid tight. It will be apparent, therefore, that the pipe connections of this invention permit pipe-end to pipe-end connection fittings such as pipe-T's, for example, to function as conventional union fittings. Another important advantage of the pipe connection structure of this invention is that it permits simple and easy disconnection of the pipe from the fitting and permits reconnection without having damaged the pipe or the fitting whereby the fitting is reusable and the pipe may be connected to the fitting without having to cut an end portion, for example, from the pipe. It is noteworthy further that the pipe connections of this invention are capable of being tightened by hand without the use of wrenches or other tools for that purpose.

While I have herein shown and described my invention in what are conceived to be the most practical and preferred embodiments, it is recognized that departures may be made therefrom within the scope of this inveniton, which is not to be limited to the details disclosed herein, but is to be accorded the full scope of the claims so as to embrace any and all equivalent structures.

Having described the invention, what is claimed as new in support of Letters Patent is:

1. A pipe connection structure comprising a cylindrical pipe of synthetic resin having substantially the physical properties of polyethylene and having an annular end surface, a fitting formed of rigid material and having inside surfaces defining an open-ended passage extending through the fitting, the fitting comprising a tubular body portion and an annular nut portion in axial alignment with the body portion, the fitting passage extending through said body and nut portions, coupling means on the body and nut portions for interconnecting said portions, the fitting having an annular recess formed therein open to and concentric with said passage and spaced axially inward from one end of the passage, said recess being defined by an annular shoulder surface on said nut portion, a stop surface and an annular radially inward facing surface between said shoulder and stop surfaces, said shoulder surface facing in a direction axially inward of the fitting with respect to said one end of the fitting passage, said stop surface facing toward said shoulder surface, a separate pipe-expanding insert member of rigid material having an opening extending axially therethrough, the insert opening defining the inner circumferences of a circular top end edge and a circular base end edge of the insert, the outside surface of the insert tapering radially outward from said top end edge to said base end edge, the insert being disposed in the pipe with said top end edge directed axially inward of the pipe, the outer diameter of said base edge being greater than the normal inside diameter of the pipe and greater than the radially inner extent of said stop surface, whereby the end portion of the pipe is expanded and flared radially outward by the insert to extend into said recess, the expanded and flared end portion of the pipe having a portion of a greater radial extent than the radial extent of said annular shoulder surface and said greater radial portion being of an axial extent less than the axial distance between said stop shoulder and said annular shoulder surface, the pipe being movable axially inward of the fitting passage to an abutment position in which at least one of said pipe end surfaces and said base end edge of the insert abuts said stop surface, and the pipe being movable in response to fluid pressure within the pipe and fitting passage in a direction axially outward of the fitting passage from said abutment position to sealing position in which said insert and said end surface of the pipe are spaced from said stop surface and the outside surface of said end portion of the pipe is in circumferentially continuous engagement with said annular shoulder surface.

2. A pipe connection structure according to claim 1 in which the fitting has an annular groove formed therein open to and concentric with said recess and spaced between said shoulder and stop surfaces, and a gasket of elastically flowable material compressed in said groove and in circumferentially continuous contact with the outside surface of said expanded end portion of the pipe.

3. A pipe connection structure comprising a cylindrical pipe of synthetic resin having substantially the physical properties of polyethylene and having an annular end surface, a fitting formed of rigid material and having inside surfaces defining an open-ended passage extending through the fitting, the fitting comprising a tubular body portion and an annular nut portion in axial alignment with the body portion, the fitting passage extending through said body and nut portions, coupling means on the body and nut portions for interconnecting said portions, the fitting having an annular recess formed therein open to and concentric with said passage and spaced axially inward from one end of the passage, said recess being defined by an annular shoulder surface on said nut portion, a stop surface and an annular radially inward facing surface between said shoulder and stop surfaces, said shoulder surface facing in a direction axially inward of the fitting with respect to said one end of the fitting passage, said stop surface facing toward said shoulder surface, a separate expander member in the pipe adjacent said end surface of the pipe, whereby the end portion of the pipe is expanded and flared radially outward to extend into said recess, the expanded and flared end portion of the pipe having a portion of a greater radial extent than the radial extent of said annular shoulder surface and said greater radial portion being of an axial extent less than the axial distance between said stop shoulder and said annular shoulder surface, the pipe being movable axially inward of the fitting passage to an abutment position in which at least one of said expander member and said end surface of the pipe abuts said stop surface and the outside surface of the pipe is spaced from said annular shoulder surface, and the pipe being movable in response to fluid pressure within the pipe and fitting passage in a direction axially outward of the fitting passage from said abutment position to sealing position in which said end surface of the pipe is spaced from said stop surface and the outside surface of said end portion of the pipe is in circumferentially continuous engagement with said annular shoulder surface.

References Cited in the file of this patent

UNITED STATES PATENTS

| | | |
|---|---|---|
| 1,506,048 | Charette | Aug. 26, 1924 |
| 2,167,258 | Wilson | July 25, 1939 |
| 2,190,419 | Evarts | Feb. 13, 1940 |
| 2,470,546 | Carlson | May 17, 1949 |

FOREIGN PATENTS

| | | |
|---|---|---|
| 256,816 | Great Britain | Aug. 19, 1926 |
| 801,859 | Great Britain | Sept. 29, 1958 |